United States Patent [19]

Pozniak

[11] Patent Number: 4,548,185
[45] Date of Patent: Oct. 22, 1985

[54] ENGINE CONTROL METHOD AND APPARATUS

[75] Inventor: Donald J. Pozniak, Utica, Mich.
[73] Assignee: General Motors Corporation, Detroit, Mich.
[21] Appl. No.: 649,119
[22] Filed: Sep. 10, 1984
[51] Int. Cl.⁴ .................................................. F02M 25/06
[52] U.S. Cl. .................................... 123/571; 123/416; 123/478; 364/431.06
[58] Field of Search ............... 123/416, 417, 478, 480, 123/486, 438, 585, 571; 364/431.05, 431.06

[56] References Cited

U.S. PATENT DOCUMENTS

| | | | |
|---|---|---|---|
| 4,142,493 | 3/1979 | Schira et al. | 364/431.06 X |
| 4,378,777 | 4/1983 | Iida et al. | 123/571 |
| 4,379,333 | 4/1983 | Ninomiya et al. | 123/417 X |
| 4,447,880 | 5/1984 | Kasai et al. | 364/431.05 |

Primary Examiner—Parshotam S. Lall
Assistant Examiner—W. R. Wolfe
Attorney, Agent, or Firm—Howard N. Conkey

[57] ABSTRACT

An apparatus and method for controlling an engine operating parameter as a function of at least one engine operating condition by predicting the value of the engine operating condition at a predetermined time in the future, determining the control signal required to establish the corresponding engine operating parameter at the future time and applying the control signal to establish the desired value at a time preceding the future time by an amount of the known system time delay.

3 Claims, 6 Drawing Figures

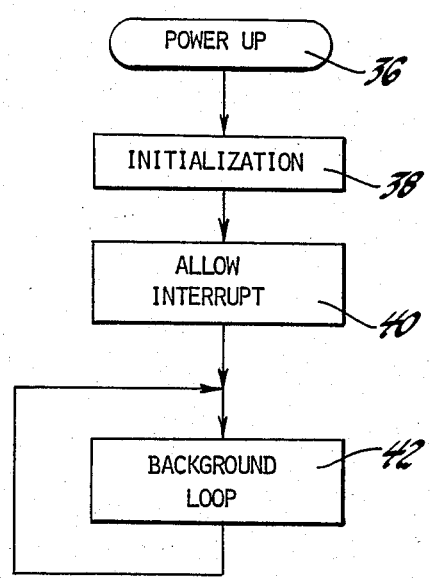
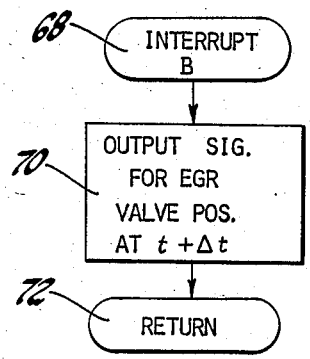
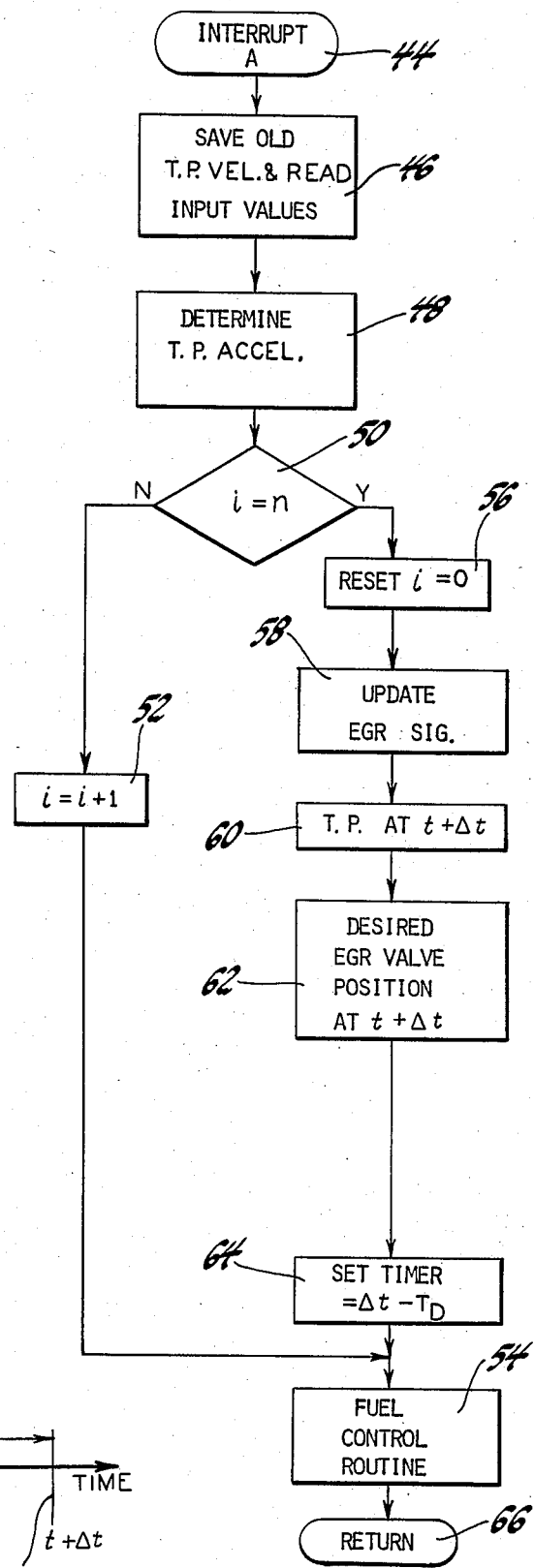
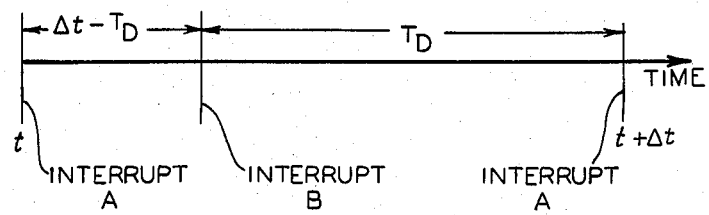

ENGINE CONTROL METHOD AND APPARATUS

This invention relates to a method and apparatus for controlling the value of an operating parameter of an internal combustion engine as a function of at least one engine operating condition in which an actuator is effective to establish the operating parameter at a desired value a predetermined time lag after receiving a command to do so.

Generally, engine operating parameters are controlled either by open loop or feedback control systems. Open loop engine control systems respond to sensed engine operating conditions to provide for control of engine operating parameters. The control law in this type of controller is based upon the calibration of the control loop. However, open loop control systems are incapable of responding to calibration changes over the useful life of the vehicle.

Feedback control systems control the operating parameter based on the difference between actual and desired values of the parameter, the desired value being determined from the sensed engine operating conditions. These systems are more sophisticated and usually more accurate than the calibrated open loop control systems. Feedback control systems also overcome the problems caused by undesirable calibration changes over the useful life of the vehicle. While having advantages over open loop control, feedback control is not usually fast responding and, in some cases, actually can have much slower response than a typical calibrated open loop control system. In fact, with feedback control, a compromise between control accuracy and response time usually must be made.

Because both calibrated open loop and feedback control systems set engine parameters in response to the existing engine operating condition, when there is a time lag in the control system, the value of the controlled parameter will always lag that which is actually required for the existing engine operating condition during transients in the engine operating condition. For example, a typical EGR control system for an internal combustion engine may include a pneumatic controller responsive to an electronic control signal for adjusting the EGR control valve. Due to the delay in the pneumatic system, a time lapse occurs between the application of a control signal and the actual time that the pneumatic system responds to position the EGR valve to the desired position. Because of this time lapse, if the engine conditions dictating the desired amount of EGR are changing, the EGR control valve position at any instant in time lags the position required for the existing engine operating conditions.

It would be desirable for an engine control system to provide for the control of an engine operating parameter having a delay in its response to an input control signal in a manner such that even during engine transient conditions, the engine operating parameter does not lag the corresponding engine operating condition.

In general, this invention provides for the control of an engine operating parameter having an inherent delay in its response to an input control signal in a manner such that the value of the engine operating parameter is set substantially to the value corresponding to the existing engine operating condition and without a delay even during engine transient conditions. By monitoring the value of the engine operating condition and the variation of the engine operating condition, the controller of this invention predicts the engine operating condition at a predetermined future time. Based on the predicted value of the engine operating condition, the controller determines the corresponding value for the engine operating parameter (such as exhaust gas recirculation valve position). The control signal for adjusting the enigne operating parameter is then applied to the actuator for adjusting the parameter at a period preceding the future time by the known delay time in the control system. In this manner, at the future time, the engine operating parameter has been adjusted to the value corresponding to the predicted engine operating condition. By this adjustment based upon the predicted value of the engine operating condition, the operating parameter more closely corresponds to that required by the actual engine operating condition at the future time.

The invention may be best understood by reference to the following description of a preferred embodiment and the drawings in which.

Figure 2:
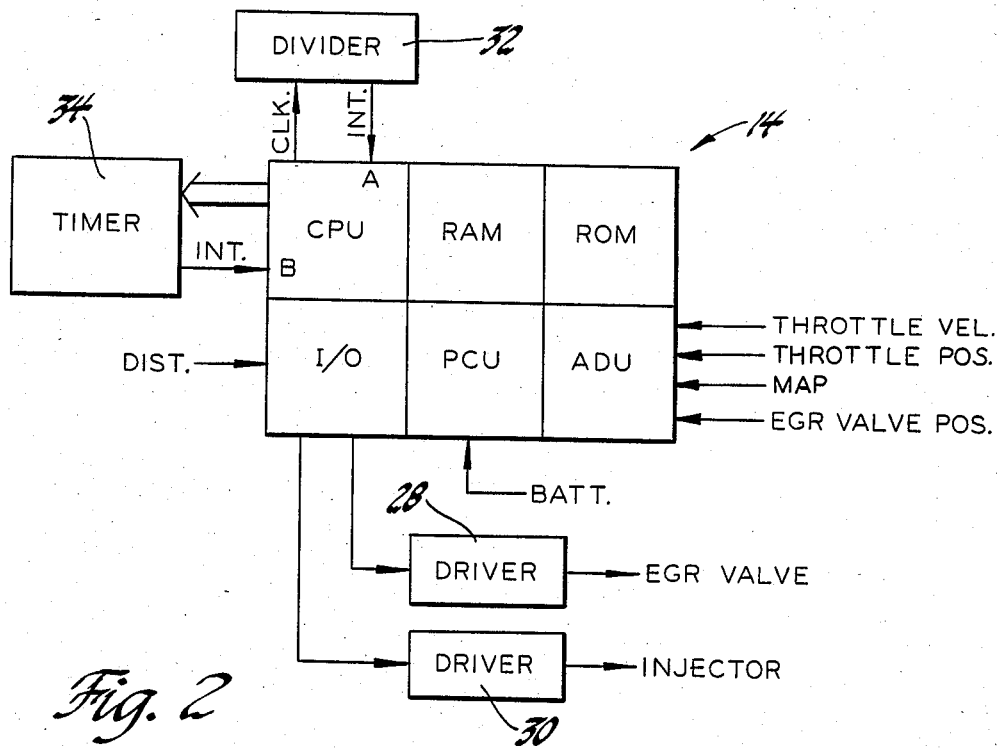
FIG. 2 is a diagram of the digital engine control module of FIG. 1 responsive to engine operating conditions for adjusting the position of the EGR valve.

FIGS. 3 thru 5 are diagrams illustrating the operation of the digital engine controller in controlling exhaust gas recirculation; and FIG. 6 is a timing diagram illustrating the operation of the digital controller of FIG. 2 in controlling exhaust gas recirculation.

Figure 1:
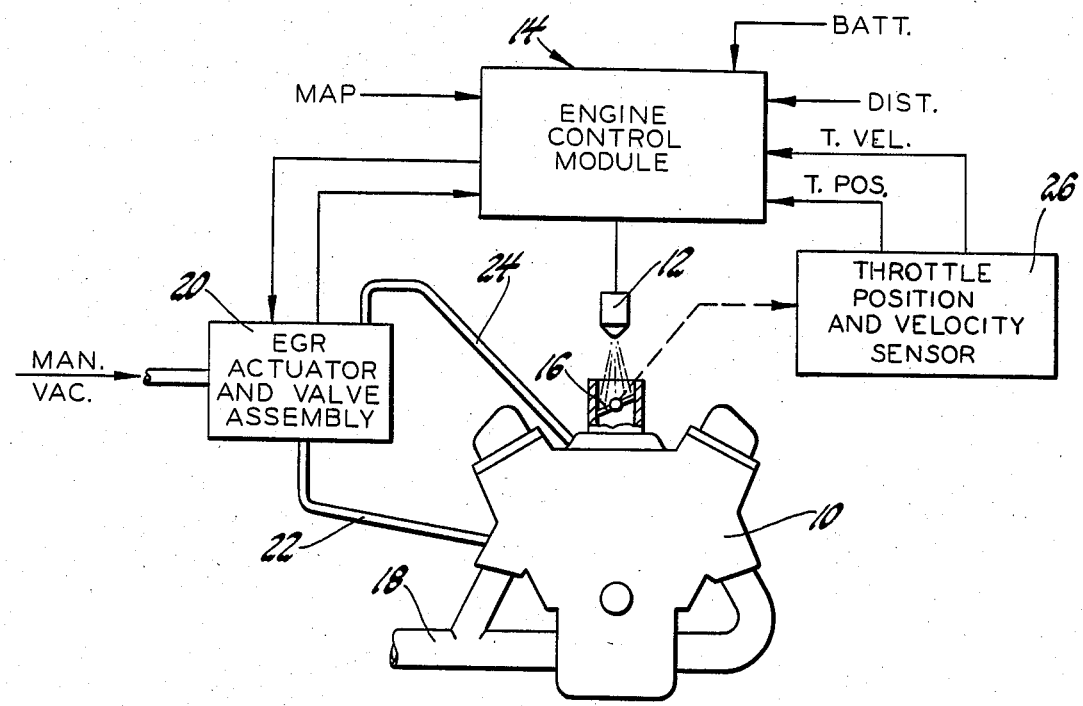
FIG. 1 illustrates an internal combustion engine and a controller for controlling the exhaust gas recirculation of the engine in accord with the principles of this invention.

Referring the FIG. 1, the invention is illustrated with respect to the control of exhaust gas recirculation of an internal combustion engine 10. Fuel is provided to the engine 10 by means of a single fuel injector 12 controlled by an engine control module 14 to inject fuel into the throttle bore of the engine 10 at a location above a conventional throttle valve 16. The fuel injected by the fuel injector 12 is mixed with the air drawn into the engine 10 through the throttle bore to provide a combustible mixture. The exhaust gases are directed to the atmosphere through the exhaust manifolds of the engine and the exhaust conduit 18. The engine is controlled by the operator by adjusting the position of the throttle valve 16 to vary the air and fuel mixture drawn into the cylinders of the engine 10. The fuel injector 12 is controlled by the engine control module 14 to maintain a scheduled air-fuel ratio in response to engine operating parameters including manifold absolute pressure (MAP) as measured by a conventional pressure sensor and engine speed as measured from pulses provided by a conventional ignition distributor. While not illustrated, the fuel quantity injected by the injector 12 could also be made a function of additional parameters including engine temperature.

An exhaust gas recirculation control system is also provided for the engine 10 for control of exhaust gas emissions. The exhaust gas recirculation is provided via an EGR actuator and valve assembly 20 receiving exhaust gases from the exhaust manifold of the engine 10 via a conduit 22 and which provides a controlled amount of recirculated exhaust gases to the intake of the engine 10 via a conduit 24. The EGR actuator and valve assembly 20 in this embodiment includes a pneumatic motor such as a vacuum operated diaphragm for positioning a valve element in the exhaust gas passage in response to the value of a control signal provided by the engine control module 14. The engine control module 14 provides the control signal for adjusting the position of the EGR valve in response to predetermined engine operating parameters such as engine speed as monitored by the pulse input from the distributor and the position and velocity of the throttle valve 16 as monitored by a throttle position and velocity sensor 26. The throttle position and velocity sensor 26 may include a potentiometer positioned by the throttle valve 16 to indicate position and a permanent magnet rotated by the throttle valve 16 relative to a coil to provide an induced voltage in the coil representing the instantaneous throttle velocity. The control signal from the engine control module 14 modulates a vacuum input from the manifold of the engine 10 to the EGR actuator and valve assembly 20. The EGR valve in the assembly is positioned in accord with the modulated vacuum to control the exhaust gases recirculated via conduit 24.

An EGR valve position sensor (not shown) provides a position signal feedback to the engine control module 14 so as to provide for closed loop positioning of the EGR valve.

A characteristic of the EGR control above described is the delay that is experienced between the application of a control signal by the engine control module 14 to the EGR actuator and valve assembly 20 and the achievement of the corresponding desired EGR valve position. This delay is substantially dominated by the pneumatic delay in the adjustment of the vacuum level in the vacuum motor positioning the EGR valve. Because of this delay, if the position of the throttle valve 16 is changing, the position of the EGR valve and accordingly the amount of exhaust gases recirculated via the conduit 24 lags the desired amount dictated by the current position of the throttle valve 16 and the engine speed. Only after the transient condition of the throttle valve and engine speed stops can the EGR valve position be adjusted by the engine control module 14 to the position corresponding to the actual throttle valve position and engine speed.

In accord with this invention, the engine operating parameters including the position of the throttle valve 16 and engine speed are monitored as well as the variation in the position of the throttle valve. Based on those values, the engine control module 14 predicts the value of throttle position at a predetermined future time. The engine control module 14 then applies a control signal to the EGR valve 20 commanding the EGR valve 20 to a position corresponding to the predicted future position of the throttle valve 16 at a time preceding the future time by the known delay time of the EGR control loop. At the future time, the EGR valve will have been positioned to the position corresponding to the predicted position of the throttle valve 16 so as to more closely provide the desired exhaust gas recirculation to the engine 10 during engine transient conditions.

Referring to FIG. 2, the engine control module 14 takes the form of a digital computer. The digital computer is standard in form and includes a central processing unit (CPU) which executes an operating program permanently stored in a read-only memory (ROM) which also stores tables and constants utilized in determining the fuel and exhaust gas recirculation requirements of the engine. Contained within the CPU are conventional counters, registers, accumulators, flag flip-flops, etc., along with a clock which provides a high frequency clock signal.

The digital computer also includes a random access memory (RAM) into which data may be temporarily stored and from which data may be read at various address locations determined in accord with the programs stored in the ROM. A power control unit (PCU) receives the voltage from the vehicle battery through the vehicle ignition switch and provides regulated power to the various operating circuits in the engine control module 14.

An input/output circuit (I/O) includes a pair of output counter sections each independently controlled by the CPU to provide EGR and injector control pulses to respective driver circuits 28 and 30 for controlling the EGR valve position and the injector opening time. The I/O also includes an input counter section which receives a pulse output from the vehicle distributor which generates a pulse for each cylinder during each engine cycle. The pulses from the distributor are used for determining the engine speed and also may be used for initiating the energization of the fuel injector 12. In this respect, the engine speed may be determined by counting clock pulses from the internal clock between pulses from the vehicle distributor.

The engine control unit 14 further includes an analog-to-digital unit (ADU) which provides for the measurement of analog signals. In the present embodiment, the analog signals include a manifold absolute pressure signal (MAP) provided by a conventional pressure sensor, the throttle position and velocity signals provided by the sensor 26, and the EGR valve position signal provided by the EGR actuator and valve assembly 20.

The analog signals are each sampled and converted under control of the CPU. The conversion process is initiated from command of the CPU which selects the particular analog input channel to be converted. At the end of the conversion cycle, the digital data is read over the data bus on command from the CPU and stored in ROM designated RAM memory locations.

The clock signal from the CPU internal clock is provided to an external divider 32 which issues a periodic interrupt pulse to an interrupt A of the CPU. These interrupt pulses may be spaced at, for example, 10 millisecond intervals. A second interrupt is provided to an interrupt B input of the CPU by a programmable timer 34. In general, the programmable timer 34 is a conventional timer including counter registers that are preset by the CPU to a digital number representing a desired timed interval. Clock pulses from the CPU are also supplied to the timer 34 to count down the number preset into the counter registers. When the counter registers are clocked to zero, the interrupt signal is generated and provided to the interrupt B input of the CPU. Each of the interrupt signals to the A and B inputs of the CPU functions to initiate a particular program routine in the program stored in the ROM.

The operation of the engine control module 14 in controlling the exhaust gas recirculation of the engine 10 in accord with the principles of this invention is illustrated in FIGS. 3 thru 6. Referring first to FIG. 3, when power is first applied to the engine control module such as by the operation of the vehicle ignition switch, the computer program is initiated at point 36 and then proceeds to a step 38 where the computer provides for system initialization. For example, at this step, initial values stored in the ROM are entered into ROM designated locations in the RAM and counters, flags, and timers are initialized. After the initialization step 38, the program proceeds to a step 40 where the program is then allowed to respond to the inputs to the interrupt A and B inputs of the CPU. After the step 40, the program proceeds to a background loop 42 which is continuously repeated. This loop may include execution of routines such as diagnostic and warning routines.

As previously indicated, in the present embodiment, the input to the interrupt A input of the CPU from the divider 32 is provided at 10 millisecond intervals. When the CPU senses the interrupt input from the divider 32, the background loop 42 is interrupted and an interrupt A routine as illustrated in FIG. 4 is executed.

Referring to FIG. 4, the background loop 42 is interrupted at step 44 to begin execution of the interrupt A routine and the program proceeds to a step 46 where the throttle velocity read and stored during execution of the prior interrupt A routine is saved in a ROM designated RAM location. Thereafter, the various engine operating conditions are read and stored. At this step, the program executes the analog-to-digital conversions of the throttle position and velocity signals, the manifold absolute pressure signal and the EGR valve position signal and stores the resulting digital numbers at ROM designated RAM locations. The engine speed is also sampled from the input counter section of the I/O and stored in a ROM designated RAM location.

Following the read routine of step 46, the program proceeds to a step 48 where the acceleration of the throttle is calculated and saved based on the previously stored value of throttle velocity saved at step 46 and the new value of throttle velocity read and stored at step 46.

Thereafter, the program proceeds to a decision point 50 where the count i in an index counter is compared to a calibration constant n. The calibration constant n in conjunction with the period of the interrupt signal generated by the divider 32 defines the time interval between updates of the control signal supplied to the EGR actuator and valve assembly 20 to command a desired position of the EGR valve. If i is less than n, the program proceeds to a step 52 where the index counter is incremented. Thereafter, the program proceeds to a step 54 where a fuel control routine is executed to determine the time duration of energization of the fuel injector 12 to achieve a desired air-fuel ratio.

If at decision point 50, it is determined that the index counter is equal to the value n, the program proceeds to a step 56 where the index counter is reset. Thereafter, a step 58 is executed which determines the desired value of the EGR valve position and the control signal to produce that position based on the current EGR dependent engine operating conditions of engine speed and throttle position. This value may be determined via a three-dimensional lookup table stored in the ROM addressed by the values of engine speed and throttle position. The EGR signal producing the desired EGR valve position retrieved from the lookup table is provided to the input/output circuit of the engine control module 14 to immediately readjust the value of the signal applied to the driver 28 for positioning the valve in the EGR actuator and valve assembly. The signal input to the driver 28 may be a pulse width modulated signal having a duty cycle determined by the EGR control signal value retrieved from the lookup table at step 58.

From step 58, the program proceeds to a step 60 where the program predicts the position of the throttle 16 at a future time $t+\Delta t$, where t is the present time. While other predictor equations may be used, in the preferred embodiment the prediction of the future throttle position at $t+\Delta t$ is based on the predictor equation $$TP_{t+\Delta t} = TP_t + (\Delta t)(TP') + (\Delta t/4)(TP'')$$

where TP' is the measured throttle position velocity and TP" is the calculated throttle position acceleration. This predicted future throttle position at $t+\Delta t$ over short intervals of time provides an accurate prediction of the future throttle position.

From step 60, the program proceeds to a step 62 where the EGR control signal producing the EGR valve position corresponding to the predicted engine operating condition at time $t+\Delta t$ is determined. As before, this value may be determined by the ROM stored lookup table. This step assumes that the engine speed at the future time $t+\Delta t$ is equal to the present engine speed. This assumption does not introduce any substantial error in the EGR valve position determined for the future time since engine speed does not vary at a rapid rate and over the short time interval defined by the calibration constant n of decision point 50 can be assumed a constant.

At step 64, a number is set into the programmable timer 34 of FIG. 2 that represents the time remaining until the EGR signal established at step 62 is to be issued to the driver circuit 28 to readjust the EGR valve position in the EGR actuator and valve assembly 20. This time can be best illustrated by reference to the time diagram of FIG. 6. At time t, the interrupt A occurred initiating the interrupt A routine at step 44. The time period until the next interrupt A is defined by the calibration constant n which establishes the period $\Delta t$. Accordingly, at time $t+\Delta t$, the next interrupt A is provided to the CPU wherein the routine is again repeated. In order that the EGR valve is positioned to the desired position at the future time $t+\Delta t$ and corresponding to the predicted engine operating condition at that future time, the EGR valve control signal corresponding to the desired EGR valve position at time $t+\Delta t$ is provided in accord with this invention at a time preceding the future time by a period equal to the time delay in the EGR actuator and valve assembly 20. This time delay $T_D$ is primarily due to the delay in the pneumatic actuator of the assembly 20. In order to accomplish this, the value set into the programmable timer 34 at step 64 is equal to the time period $\Delta t$ minus the time delay period $T_D$. Since the interrupt A routine is substantially instantaneous in its execution, it is assumed that the value $\Delta t - T_D$ is inserted into the programmable timer subtantially at the present time t. In another embodiment, compensation for the execution time of the interrupt A routine 44 may be accounted for and the numerical value inserted into the programmable timer 34 adjusted accordingly. From this point in time, the programmable timer 34 is decremented by the clock pulses to time the interval $\Delta t - T_D$. From step 64, the program proceeds to the fuel control routine 54. Thereafter at step 66, the program returns to the background loop 42 of FIG. 3.

When the programmable timer 34 has timed the programmed period established at step 64, an interrupt signal is provided to the interrupt B input of the CPU. Upon receipt of this interrupt signal, the background loop 42 is interrupted and the program proceeds to execute an interrupt B routine initiated at step 68. From step 68, the program proceeds to a step 70 where the value of the EGR signal determined to establish the desired EGR valve position at the future time $t+\Delta t$ is provided to the input/output circuit and outputted to the driver circuit 28. The output of the driver 28 is applied to the actuator in the EGR actuator and valve assembly 20 to effect adjustment of the vacuum level for controlling the EGR valve position. Following step 70, the program returns to the background loop 42 at step 72. The signal output of the I/O circuit of the computer may take the form of a duty cycle modulated signal having a duty cycle value determined by the interrupt routine of FIG. 4. The duty cycle value is set at time t to the value established at step 58 and at time $t+(\Delta t-T_D)$ to the value established at step 62.

In summary and with reference to FIG. 6, at time t, the interrupt A routine is executed and the control signal to establish the desired EGR valve position corresponding to the current values of the engine operating conditions is provided to the EGR actuator and valve assembly 20. At substantially the same time, (A) the values of the engine operating conditions at a future time $t+\Delta t$ are predicted and the control signal required to establish the corresponding desired EGR valve position is determined and (B) a time value equal to the time to the future time ($\Delta t$) minus the known time delay ($T_D$) in the EGR control loop is set into the timer 34. At a time preceding the future time by the EGR control loop time delay $T_D$, the timer 34 initiates the interrupt B routine which causes the control signal value provided to the EGR actuator and valve assembly 20 to be adjusted to the previously determined value establishing the desired EGR valve position at the future time $t+\Delta t$. Thereafter upon expiration of the time period $T_D$, the EGR valve is positioned to the desired position corresponding to the engine operating conditions predicted to exist at that time.

The interrupt A and interrupt B routines are fully executed at each $\Delta t$ interval as defined by the calibration constant n so that the amount of exhaust gases recirculated is continuously established at the value determined by the current engine operating condition even during engine transient conditions.

The foregoing description of the preferred embodiment of the invention for purposes of illustrating the invention is not to be considered as limiting or restricting the invention since many modifications may be made by the exercise of skill in the art without departing from the scope of the invention.

The embodiments of the invention in which an exclusive property or privilege is claimed are defined as follows:

1. The method of controlling the value of an operating parameter of an engine as a function of at least one engine operating condition, the engine having an actuator responsive to a control signal for adjusting the operating parameter after a known delay time to a desired value, the method comprising the steps of:
   determining the value of the engine operating condition;
   determining the variation of the engine operating condition;
   predicting the value of the engine operating condition at a future time based on the determined value and variation of the engine operating condition;
   determining the desired value of the engine operating parameter corresponding to the predicted value of the engine operating condition;
   determining the value of a control signal required to establish the desired value of the engine operating parameter;
   providing the control signal at the determined value to the actuator at a time that precedes the future time by the known delay time, whereby the desired value of the engine operating parameter is established at the future time at which the corresponding predicted value of the engine operating condition was to occur.

2. For an internal combustion engine in which the desired value of an engine control parameter is determined as a function of engine throttle and engine speed values and an actuator is effective to establish the control parameter at the desired value a predetermined time lag after receiving a command to do so, the method comprising:
   determining the present engine throttle value;
   determining the present time variance in the engine throttle value;
   determining the present engine speed value;
   predicting the engine throttle value at a predetermined future time based upon the present engine throttle value and the present time variance in the engine throttle value;
   determining the desired value of the engine control parameter at the future time based upon the predicted engine throttle value and the present engine speed value;
   commanding the actuator to establish the control parameter at the desired value in such a manner that the command is received by the actuator at a time preceding the future time by the predetermined time lag so that the desired value of the control parameter is established at the future time.

3. A system for controlling the value of an operating parameter of an engine as a function of at least one engine operating condition, the engine having an actuator responsive to a control signal for adjusting the operating parameter after a known delay time to a desired value, the system comprising, in combination:
   means for measuring the value of the engine operating condition;
   means for measuring the time variance of the engine operating condition;
   means for predicting the value of the engine operating condition at a future time based on the measured and determined time variance of the engine operating condition; and
   means for providing a control signal to the actuator at a time that precedes the future time by the known delay time, the control signal having a value for establishing a desired value of the engine operating parameter that corresponds to the predicted value of the engine operating condition, whereby the desired value of the engine operating parameter is established at the future time at which the corresponding predicted value of the engine operating condition was to occur.

\* \* \* \* \*